US000001798H

United States Statutory Invention Registration [19]

[11] Reg. Number: H1,798

Modic

[45] **Published: *Jul. 6, 1999**

[54] SOFT COMPOUNDS CONTAINING ELASTOMERIC METALLOCENE POLYOLEFINS AND STYRENIC BLOCK COPOLYMERS

[75] Inventor: Michael John Modic, Richmond, Tex.

[73] Assignee: Shell Oil Company, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/756,462

[22] Filed: Nov. 26, 1996

Related U.S. Application Data

[63] Continuation of application No. 08/363,442, Dec. 22, 1994, abandoned.

[51] Int. Cl.[6] ..... C08F 255/10

[52] U.S. Cl. ..... 524/585

[58] Field of Search ..... 524/505, 534

[56] References Cited

U.S. PATENT DOCUMENTS

| | | | |
|---|---|---|---|
| 3,299,174 | 1/1967 | Kuhre et al. | 260/876 |
| 3,459,831 | 8/1969 | Luftglass et al. | 260/876 |
| 4,479,989 | 10/1984 | Mahal | 428/35 |
| 4,663,220 | 5/1987 | Wisneski et al. | 428/221 |
| 4,789,699 | 12/1988 | Kieffer et al. | 524/271 |
| 4,970,259 | 11/1990 | Mitchell et al. | 524/505 |
| 4,977,014 | 12/1990 | Mitchell et al. | 428/220 |
| 5,068,138 | 11/1991 | Mitchell et al. | 428/36.8 |
| 5,093,422 | 3/1992 | Himes | 525/98 |
| 5,260,126 | 11/1993 | Collier, IV et al. | 428/288 |
| 5,272,236 | 12/1993 | Lai et al. | 526/348.5 |
| 5,278,272 | 1/1994 | Lai et al. | 526/348.5 |
| 5,288,791 | 2/1994 | Collier, IV et al. | 524/505 |
| 5,288,792 | 2/1994 | Buxbaum | 252/25 |
| 5,304,599 | 4/1994 | Himes | 525/98 |
| 5,320,899 | 6/1994 | Djiauw | 428/220 |
| 5,322,728 | 6/1994 | Davey et al. | 428/296 |
| 5,591,792 | 1/1997 | Hattori et al. | 524/271 |

FOREIGN PATENT DOCUMENTS

| | | |
|---|---|---|
| 0254346 | 1/1988 | European Pat. Off. . |
| 4236249 | 8/1992 | Japan . |
| 5-51494 | 3/1993 | Japan . |
| 93/06169 | 4/1993 | WIPO . |
| 94/18263 | 8/1994 | WIPO . |
| 95/33006 | 12/1995 | WIPO . |

*Primary Examiner*—Charles T. Jordan
*Assistant Examiner*—Meena Chelliah

[57] ABSTRACT

A soft multicomponent compound comprising a styrenic block copolymer having good elastomeric properties, a paraffinic oil, a crystalline polyolefin and a metallocene polyolefin having a density from 0.86 to 0.91, a molecular weight distribution less than 3, and good distribution of ethylene and from 12% to 30% by weight of one or more α-olefin monomers having from 4 to 12 carbon atoms. The metallocene polyolefin partly replaces the styrenic block copolymer in conventional soft compounds and provides the desired softness at significantly lower oil contents, thus avoiding surface tackiness and oil extractability.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SOFT COMPOUNDS CONTAINING ELASTOMERIC METALLOCENE POLYOLEFINS AND STYRENIC BLOCK COPOLYMERS

This is a continuation of application Ser. No. 08/363,442, filed Dec. 22, 1994, abandoned on Jan. 23, 1997.

1. Field of the Invention

The present invention relates to styrenic block copolymer compounds, specifically to soft compounds that contain a polyolefin at paraffinic oil 2. Background of the Invention Extrudable elastomeric compositions having a good balance of softness and strength have been prepared by blending a styrenic block copolymer, a crystalline polyolefin, and a paraffinic oil. Such blends have been used to make a variety of 15 products for medical and consumer markets The known blends have occassional problems with surface tackiness and oil exctractability as a result of the high level of oil needed to achieve softness Variations in the amounts of the components have failed to eliminate the problems and maintain the desired 20 balance of strength and softness The soft compounds are optionally blended with a hard filler for some uses, but the filler does not avoid the problems with surface tackiness and oil extractability

SUMMARY OF THE INVENTION

The present invention is a soft multicomponent compound comprising a styrenic block copolymer having good elastomeric properties, a crystalline polyolefin, a paraffinic oil, and an elastic metallocene polyolefin having a density from 0.86 to 0.89, a molecular weight distribution less than 3, and good distribution of ethylene and from 12% to 30% by weight of one or more α-olefin monomers having from 4 to 12 carbon atoms. The elastic metallocene polyolefin partly replaces the styrenic block copolymer and/or the paraffinic oil in conventional soft compounds and provides the desired softness at significantly lower oil contents, thus avoiding surface tackiness and oil extractability.

DETAILED DESCRIPTION OF THE INVENTION

The soft multicomponent compounds of the present invention comprise from 30% to 70% by weight of hydrocarbon components of a blend of elastomeric polymers, from 8% to 40% by weight of hydrocarbon components of a crystalline polyolefin, and from 5% to 60% by weight of hydrocarbon components of a paraffinic oil, wherein the elastomeric polymers comprise a styrenic block copolymer having at least two monoalkenyl arene blocks separated by a saturated conjugated diene block, and an elastomeric metallocene polyolefin having a density from 0.86 to 0.89, a molecular weight distribution less than 3, and good distribution of ethylene and from 12% to 30% by weight of one or more α-olefin monomers having from 4 to 12 carbon atoms, and wherein the styrenic block copolymer is at least 25% by weight of the hydrocarbon components and the metallocene polyolefin is at least 5% by weight of the hydrocarbon components.

The metallocene polyolefins are polyolefins produced with a metallocene catalyst as described in United States Patents No. 5,322,728 and 5,272,236 which are descriptions are incorporated by referenece herein. Such metallocene polyolefins are available from Dow Chemical Company under the trademark ENGAGE (ethylene/octene copolymers) and from Exxon Chemical Company under the trademark EXACT (ethylene/butene copolymers, ethylene/hexene copolymers, or ethylene/hexene/butene terpolymers). The elastic metallocene polyolef ins have low crystallinity when ethylene is copolymerized with from 12% to 30% by weight of one or more α-olefin monomers having from 4 to 12 carbon atoms.

The crystalline polyolefins utilized in the extrudable composition must be one which, when blended with the elastomeric block copolymer or a mixture of elastomeric block copolymers and subjected to an appropriate combination of elevated pressure and elevated temperature conditions, is extrudable, in blended form, with the elastomeric block copolymer or a mixture of elastomeric block copolymers In particular, preferred polyolefin materials include polyethylene, polypropylene, and polybutylene, including ethylene copolymers, propylene copolymers, and butylene copolymers Blends of two or more of the polyolefins may be utilized.

An injection molding grade crystalline polypropylene, such as Polypropylene 5A15 homopolymer (Melt flow rate 5 g/10 minutes, from Shell Chemical Co), is typically used to make soft compounds with elastomers and oils.

The styrenic block copolymers have at least two monoalkenyl arene blocks, preferably two polystyrene blocks, separated by a block of a saturated conjugated diene, preferably a saturated polybutadiene block. The preferred styrenic block copolymers have a linear structure although branched or radial polymers or functionalized block copolymers make useful compounds.

Polystyrene-saturatedpolybutadiene-polystyrene(S-EB-S) and polystyrene-saturated polyisoprene-polystyrene (S-EP-S) block copolymers comprise polystyrene endblocks having a number average molecular weight from 5,000 to 50,000 and saturated polybutadiene or saturated polyisoprene midblocks having a number average molecular weight from 20,000 to 200,000. The saturated polybutadiene blocks preferably have from 35% to 55% 1,2-configuration and the saturated polyisoprene blocks preferably have greater than 85% 1,4-configuration.

The total number average molecular weight of the styrenic block copolymer is preferably from 30,000 to about 250,000 if the copolymer has a linear structure. Such block copolymers may have an average polystyrene content from 10% by weight to 40% by weight.

A preferred S-EB-S block copolymer for soft compounds is available from the Shell Chemical Company and has a number average molecular weight of about 280,000 with polystyrene endblocks each having a number average molecular weight of about 29,000 giving a polystyrene content of 32% by weight.

The block copolymers may be prepared using free-radical, cationic and anionic initiators or polymerization catalysts Such polymers may be prepared using bulk, solution or emulsion techniques. In any case, the polymer containing at least ethylenic unsaturation will, generally, be recovered as a solid such as a crumb, a powder, a pellet, or the like.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an organoalkali metal compound in a suitable solvent at a temperature within the range from about −150° C. to about 300° C., preferably at a temperature within the range from about 0C to about 100° C. Particularly effective anionic polymerization initiators are organolithium compounds having the general formula:

$RLi_n$ wherein R is an aliphatic, cycloaliphatic, aromatic, or alkyl-substituted aromatic hydrocarbon radical having from 1 to about 20 carbon atoms; and n is an integer of 1 to 4.

In addition to sequential techniques to obtain triblocks, tetrablocks, and higher orders of repeating structures, anionic initiators can be used to prepare diblocks of styrene-polydiene having a reactive ("live") chain end on the diene block which can be reacted through a coupling agent to create, for example, $(S\text{-}I)_x \cdot Y$ or $(S\text{-}B)_x \cdot Y$ structures wherein x is an integer from 2 to about 30, Y is a coupling agent, I is isoprene, B is butadiene and greater than 65 percent of S-I or S-B diblocks are chemically attached to the coupling agent. Y usually has a molecular weight which is low compared to the polymers being prepared and can be any of a number of materials known in the art, including halogenated organic compounds; halogenated alkyl silanes; alkoxy silanes; various esters such as alkyl and aryl benzoates, difunctional aliphatic esters such as dialkyl adipates and the like; polyfunctional agents such as divinyl benzene (DVB) and low molecular weight polymers of DVBD Depending on the selected coupling agent the final polymer can be a fully or partially coupled linear triblock polymer (x=2), i.e., S·I·Y·I·S; or branched, radial or star configurations The coupling agent, being of low molecular weight, does not materially affect the properties of the final polymer. DVB oligomer is commonly used to create star polymers, wherein the number of diene arms can be 7 to 20 or even higher.

It is not required in coupled polymers that the diblock units all be identical In fact, diverse "living" diblock units can be brought together during the coupling reaction giving a variety of unsymmetrical structures, i[]e, the total diblock chain lengths can be different, as well as the sequential block lengths of styrene and diene.

Since the number of S-EB or S-EB polymeric arms in a star polymer can be large, the number average molecular weights of star polymers within the invention can be much larger than those of linear S-EB-S or S-EP-S polymers, ie., up to 500,000 or higher. Such higher molecular weight polymers have the viscosity of lower molecular weight linear polymers and thus are processable in spite of the high molecular weight.

The block copolymers are hydrogenated to improve weatherability and oxidation stability. In general, the hydrogenation or selective hydrogenation of the polymer may be accomplished using any of the several hydrogenation processes known in the prior art. For example the hydrogenation may be accomplished using methods such as those taught, for example, in U.S. Patent Nos. 3,494,942; 3,634,594; 3,670,054; 3,700,633; and Re. 27,145, the disclosure of which patents are incorporated herein by reference. The methods known in the prior art and useful in the present invention for hydrogenating polymers containing ethylenic unsaturation and for hydrogenating or selectively hydrogenating polymers containing aromatic and ethylenic unsaturation, involve the use of a suitable catalyst, particularly a catalyst or catalyst precursor comprising an iron group metal atom, particularly nickel or cobalt, and a suitable reducing agent such as an aluminum alkyl In general, the hydrogenation will be accomplished in a suitable solvent at a temperature within the range from about 20° C. to about 100° C. and at a hydrogen partial pressure within the range from about 100 psig to about 5,000 psig, preferably about 100 psig to 1,000 psig. Catalyst concentrations within the range from about 10 ppm (wt) to about 500 ppm (wt) of iron group metal based on total solution are generally used and contacting at hydrogenation conditions is generally continued for a period of time within the range from about 60 to about 240 minutes. After the hydrogenation is completed, the hydrogenation catalyst and catalyst residue will, generally, be separated from the polymer.

Paraffinic oils which may are used in the extrudable elastomeric composition should be capable of being melt-processed with the other components of the extrudable elastomeric composition without degrading An exemplary processing oil is a white mineral oil available under the trade designation Drakeol 34 from the Pennzoil Company Pennreco Division. Drakeol 34 has a specific gravity of 00864–00878 at 60° F., a flash point of 460° F, and viscosity of 370–420 SUS at 100° F. Suitable vegetable oils and animal oils or their derivatives may also be used as the processing oil.

While the principal components of the extrudable elastomeric composition used to form the soft compositions have been described in the foregoing, such extrudable elastomeric composition is not limited thereto, and can include non-essential components. Exemplary materials which could be used as additional components would include, without limitation, pigments, antioxidants, stabilizers, surfactants, waxes, flow promoters, solvents, particulates, and materials added to enhance processability and pellet handling of the composition. Soft elastomer compounds are often blended with from 5% to 40% by weight of the hydrocarbon components of a hard inorganic filler.

DETAILED DESCRIPTION OF THE PREFERRED EMBODIMENTS

The preferred extrudable elastomeric composition of the present invention comprises from 30% to 50% by weight of hydrocarbon components of a blend of elastomeric polymers, from 10% to 25% by weight of hydrocarbon components of a crystalline polyolefin, and from 15% to 60% by weight of hydrocarbon components of a paraffinic oil, wherein the elastomeric polymers comprise a styrenic block copolymer having at least two monoalkenyl arene blocks separated by a saturated conjugated diene block, and an elastic metallocene polyolefin having a density from 0.865 to 0.887, a molecular weight distribution less than 3, and good distribution of ethylene and from 15% to 30% by weight of one or more α-olefin monomers having from 4 to 12 carbon atoms, and wherein the styrenic block copolymer is at least 25% by weight of the hydrocarbon components and the metallocene polyolefin is at least 10% by weight of the hydrocarbon components.

The preferred blends have a surprising balance of softness, elasticity, and tensile strength in comparison to conventional blends of styrenic block copolymer and conventional polyolefins.

Extrudable elastic compositions were prepared by blending varying amounts of styrenic block copolymers, available from the Shell Chemical Company, with a metallocene polyolefin available from Dow Chemical Company or Exxon Chemical Company, a crystalline polypropylene (PP 5A15 polypropylene from Shell Chemical), and an extending oil (Drakeol 34 white mineral oil).

As used herein, the term "tensile strength" refers to the resistance of an elastic material to being elongated as determined in accordance with ASTM D-412 using 0.125 inch wide and 0.080 inch thick dumbbell samples that are cut from plaques. Plaques formed from a blend of an elastomeric block copolymer and other materials such as, for example, a polyolefin (metallocene and/or crystalline), and/or an extending oil were injection molded. Tensile testing was performed on an Instron Model 1123 Universal Test Machine utilizing a crosshead speed of 1 inch/min. As used herein, the term "elongation" refers to the percent extension of an elastic material until breakage as determined in accordance with ASTM D-412 as described above. A mechanical extensiometer was used during the testing to obtain a more accurate "elongation". The gap distance for the extensiometer was 1 inch.

As used herein, the "compression set" was determined according to ASTM D-395, Method A, Type I. Disks of diameter 1 inch were cut out of injection molded plaques. These disks were stacked to approximately 0.5 inches in height and compressed between two flat chrome plates. The degree of compression was controlled by the use of standard metal spacers. The disk stacks were placed under compression for 22 hours at room temperature or 70 degrees C., and then allowed to recover for 30 minutes before their final thickness was measured.

As used herein, the term "bending modulus" was determined according to ASTM D-747-86 using a Tinius Olsen Stiffness Tester. Rectangular specimens of dimensions 0.5 inch by 2.5 inches were cut out of injection molded plaques for this test.

As used herein, the "hardness" was determine according to ASTM D2240 after 10 seconds of resistance on the Shore A hardness scale. The hardness value is the average of five measurements taken at different locations around the 4 inch by 5 inch injection molded plaques.

As used herein, the "number average molecular weight" was determined utilizing conventional gel permeation chromatography techniques. All molecular weights are measured prior to hydrogenation which will increase them by a small amount.

COMPARISON EXAMPLE A

In Comparison Example A, an S-EB-S elastomer (32% styrene, Target Mn=280,000) was blended in a 25mm twin screw extruder at 300 RPM with a paraffinic oil and a crystalline polypropylene having a melt flow index of 5 g/10 minutes according to ASTM D1238, Condition E to make conventional soft multicomponent compounds having 45% by weight of hydrocarbon components of the S-EB-S elastomer. The components (wt% of hydrocarbons) are shown in Table 1 and physical property results are shown in Table 2.

EXAMPLES 1–3

Examples 1, 2, and 3 represent partial replacement of the styrenic block copolymer and the paraffinic oil in Comparison Example A with a metallocene polyolefin having a molecular weight distribution less than 3, good dispersion of ethylene and one or more α-olefin comonomer having from 4 to 8 carbon atoms, and a density from 0.865 to 0.88. The components are shown in Table 1 and physical property results are shown in Table 2.

TABLE 1

| Example | A | 1 | 2 | 3 |
|---|---|---|---|---|
| S-EB-S block copolymer, wt % a) | 45 | 40 | 40 | 40 |
| Metallocene polyolefin, wt % | | | | |
| 1 b) | 0 | 10 | 0 | 0 |
| 2 c) | 0 | 0 | 10 | 0 |
| 3 d) | 0 | 0 | 0 | 10 |
| Crystalline | 15 | 15 | 15 | 15 |

TABLE 1-continued

| Example | A | 1 | 2 | 3 |
|---|---|---|---|---|
| Polyolefin, wt % e) | | | | |
| Paraffinic | 40 | 35 | 35 | 35 |
| Oil, wt % f) | | | | |

a. S-EB-S polymer (32% styrene, Target Mn = 280,000) from Shell.
b. Exact 4033 polymer (ethylene/butene copolymer, dens. 0.88, melt index = 0.8 dg/min) from Exxon.
c. Exact 4049 polymer (ethylene/butene copolymer, dens. 0.873, melt index = 4.5 dg/min) from Exxon.
d. Exact 5009 polymer (ethylene/butene copolymer, dens. 0.865, melt index = 20 dg/min) from Exxon.
e. Polypropylene 5A15 (melt flow rate = 5 g/10 min) from Shell.
f. Drakeol 34 paraffinic oil.

TABLE 2

| Example | A | 1 | 2 | 3 |
|---|---|---|---|---|
| Hardness | 59 | 61 | 61 | 58 |
| Tensile strength, psi | 1011 | 1589 | 780 | 623 |
| Elongation at break, % | 734 | 797 | 489 | 386 |

Example 1 shows improved tensile strength and elongation as a result of the replacement of a portion of the styrenic block copolymer and paraffinic oil in comparison to Comparative Example A. The use of other elastomeric metallocene polymers of lower density gives properties lower than Example 1, but still considered to be useful inventions.

EXAMPLES 4–6

Examples 4, 5, and 6 represent partial replacement of the styrenic block copolymer and the oil in Comparison Example A with a metallocene polyolef in having a molecular weight distribution less than 3, good dispersion of ethylene and an α-olefin comonomer having from 4 to 8 carbon atoms, and a density from 0.873 to 0.887. The components are shown in Table 3 and physical property results are shown in Table 4.

The results show that Comparison Example A gives lower tensile strength in comparison to Examples 4 and 5. The use of a lower density elastomeric metallocene polymer in Example 6 shows properties lower than Example 4 or 5, but still considered to be of value.

EXAMPLES 7–9

Examples 7, 8, and 9 represent partial replacement of of the styrenic block copolymer and the oil in Comparison Example A with a metallocene polyolefin having a molecular weight distribution less than 3, good dispersion of ethylene and an α-olefin comonomer having from 4 to 8 carbon atoms, and a density from 0.865 to 0.87. The components are shown in Table 5 and physical property results are shown in Table 6.

TABLE 3

| Example | A | 4 | 5 | 6 |
|---|---|---|---|---|
| S-EB-S block copolymer, wt % a) | 45 | 35 | 35 | 35 |
| Metallocene polyolefin, wt % | | | | |
| 1 b) | 0 | 20 | 0 | 0 |
| 2 c) | 0 | 0 | 20 | 0 |
| 3 d) | 0 | 0 | 0 | 20 |
| Crystalline | 15 | 15 | 15 | 15 |

TABLE 3-continued

| Example | A | 4 | 5 | 6 |
|---|---|---|---|---|
| Polyolefin, wt % e) | | | | |
| Paraffinic Oil, wt % f) | 40 | 30 | 30 | 30 |

a. S-EB-S polymer (32% styrene, Target Mn = 280,000) from Shell.
b. Exact 4011 polymer (ethylene/butene copolymer, dens. 0.887, melt index = 2.2 dg/min) from Exxon.
c. Exact 4033 polymer (ethylene/butene copolymer, dens. 0.88, melt index = 0.8 dg/min) from Exxon.
d. Exact 4049 polymer (ethylene/butene copolymer, dens. 0.873, melt index = 4.5 dg/min) from Exxon.
e. Polypropylene 5A15 (melt flow rate = 5 g/10 min) from Shell.
f. Drakeol 34 paraffinic oil.

TABLE 4

| Example | A | 4 | 5 | 6 |
|---|---|---|---|---|
| Hardness | 59 | 70 | 66 | 64 |
| Tensile strength, psi | 1011 | 1563 | 2202 | 985 |
| Elongation at break, % | 734 | 666 | 805 | 518 |
| Compression Set (RT), % | 24.3 | 24.7 | 25.8 | — |
| Compression Set (70 C), % | 51.6 | 79.3 | 72.3 | |
| Bending Modulus, % | 259 | 331 | 335 | — |

The results show that elastomeric metallocene polymers based on either octene co-monomer or butene co-monomer can be used as replacements for the styrenic block copolymer and/or paraffinic oil.

EXAMPLES 10–13

Examples 10, 11, 12, and 13 represent partial replacement of the styrenic block copolymer and the oil in Comparison Example A with a metallocene polyolefin having a molecular weight distribution less than 3, good dispersion of ethylene and an α-olefin comonomer having from 4 to 8 carbon atoms, and a density from 0.865 to 0.873. The components are shown in Table 7 and physical property results are shown in Table 8.

The results show that higher density, lower melt index elastomeric metallocene polymers (ie. Example 10 and 12) give improved performance compared to lower density, higher melt index elastomeric metallocene polymers (ie. Example 11 and 13) as replacements for a portion of styrenic block copolymer and paraffinic oil. The replacement of a significant quantity of paraffinic oil as shown in Example 10–14 compared to Comparative Example A will result to reduced oil extraction and oil bleed-out problems in application use.

TABLE 5

| Example | A | 7 | 8 | 9 |
|---|---|---|---|---|
| S-EB-S block copolymer, wt % a) | 45 | 35 | 35 | 35 |
| Metallocene polyolefin, wt % | | | | |
| 1 b) | 0 | 20 | 0 | 0 |
| 2 c) | 0 | 0 | 20 | 0 |
| 3 d) | 0 | 0 | 0 | 20 |

TABLE 5-continued

| Example | A | 7 | 8 | 9 |
|---|---|---|---|---|
| Crystalline Polyolefin, wt % e) | 15 | 15 | 15 | 15 |
| Paraffinic Oil, wt % f) | 40 | 30 | 30 | 30 |

a. S-EB-S polymer (32% styrene, Target Mn = 280,000) from Shell.
b. Exact 5009 polymer (ethylene/butene copolymer, dens. 0.865, melt index = 20 dg/min) from Exxon.
c. ENGAGE 8100 polymer (24% octene, dens. 0.87, melt index = 1.0 dg/min) from Dow.
d. ENGAGE 8200 polymer (24% octene, dens. 0.87, melt index = 5.0 dg/min) from Dow.
e. Polypropylene 5A15 (melt flow rate = 5 g/10 min) from Shell.
f. Drakeol 34 paraffinic oil.

TABLE 6

| Example | A | 7 | 8 | 9 |
|---|---|---|---|---|
| Hardness | 59 | 56 | 66 | 61 |
| Tensile strength, psi | 1011 | 562 | 774 | 715 |
| Elongation at break, % | 734 | 383 | 388 | 440 |

TABLE 7

| Example | A | 10 | 11 | 12 | 13 |
|---|---|---|---|---|---|
| S-EB-S block copolymer, wt % a) | 45 | 26.5 | 26.5 | 26.5 | 26.5 |
| Metallocene polyolefin, wt % | | | | | |
| 1 b) | 0 | 35 | 0 | 0 | 0 |
| 2 c) | 0 | 0 | 35 | 0 | 0 |
| 3 d) | 0 | 0 | 0 | 35 | 0 |
| 4 e) | 0 | 0 | 0 | 0 | 35 |
| Crystalline Polyolefin, wt % f) | 15 | 15 | 15 | 15 | 15 |
| Paraffinic Oil, wt % g) | 40 | 23.5 | 23.5 | 23.5 | 23.5 |

a. S-EB-S polymer (32% styrene, Target Mn = 280,000) from Shell.
b. Exact 4049 polymer (ethylene/butene copolymer, dens. 0.873, melt index = 0.8 dg/min) from Exxon.
c. Exact 5009 polymer (ethylene/butene copolymer, dens. 0.865, melt index = 20 deg/min) from Exxon.
d. ENGAGE 8100 polymer (24% octene, dens. 0.87, melt index = 1.0 dg/min) from Dow.
e. ENGAGE 8200 polymer (24% octene, dens. 0.87, melt index = 5.0 dg/min) from Dow.
f. Polypropylene 5A15 (melt flow rate = 5 g/10 min) from Shell.
g. Drakeol 34 paraffinic oil.

TABLE 8

| Example | A | 10 | 11 | 12 | 13 |
|---|---|---|---|---|---|
| Hardness | 59 | 67 | 54 | 68 | 66 |
| Tensile strength, psi | 1011 | 1177 | 621 | 1436 | 868 |
| Elongation at break, % | 734 | 649 | 422 | 771 | 518 |

COMPARISON EXAMPLE B

In Comparison Example B, an S-EB-S elastomer (32% styrene, Target Mn =280,000, from Shell Chemical Co.) was blended with a paraffinic oil and a crystalline polypropylene having a melt flow rate of 5g/10 minutes to make conventional soft multicomponent compounds having 59% by weight of hydrocarbon components of the S-EB-S elastome. The components (wt% of hydrocarbons) are shown in Table 9 and physical property results are shown in Table 10.

EXAMPLES 14–15

Examples 14 and 15 represent partial replacement of the styrenic block copolymer and the paraffinic oil in Comparison Example B with a metallocene polyolefin having a molecular weight distribution less than 3, good dispersion of ethylene and an α-olefin comonomer having from 4 to 8 carbon atoms, and a density from 0.865 to 0.873. The components are shown in Table 9 and physical property results are shown in Table 10.

The results show that Examples 14–15 have a lower hardness than Comparative Example B but still maintain much of their tensile strength and have high elongation.

EXAMPLES 16–19

Examples 16, 17, 18, and 19 represent partial replacement of the styrenic block copolymer and the paraffinic oil in Comparison Example B with a metallocene polyolefin having a molecular weight distribution less than 3, good dispersion of ethylene and an α-olefin comonomer having from 4 to 8 carbon atoms, and a density from 0.865 to 0.873.

TABLE 9

| Example | B | 14 | 15 |
|---|---|---|---|
| S-EB-S block copolymer, wt % a) | 59 | 52 | 52 |
| Metallocene polyolefin, wt % | | | |
| 1 b) | 0 | 10 | 0 |
| 2 c) | 0 | 0 | 10 |
| Crystalline Polyolefin, wt % d) | 15 | 15 | 15 |
| Paraffinic Oil, wt % e) | 26 | 23 | 23 |

a. S-EB-S polymer (32% styrene, Target Mn = 280,000) from Shell.
b. Exact 4049 polymer (ethylene/butene copolymer, dens. 0.873, melt index = 0.8 dg/min) from Exxon.
c. Exact 5009 polymer (ethylene/butene copolymer, dens. 0.865, melt index = 20 dg/min) from Exxon.
d. Polypropylene 5A15 (melt flow rate = 5 g/10 min) from Shell.
e. Drakeol 34 paraffinic oil.

TABLE 10

| Example | B | 14 | 15 |
|---|---|---|---|
| Hardness | 72 | 65 | 67 |
| Tensile strength, psi | 1105 | 955 | 912 |
| Elongation at break, % | 315 | 351 | 319 |

The components are shown in Table 11 and physical property results are shown in Table 12.

The results show that Comparison Example B gives higher hardness, lower tensile strength and lower elongation in comparison to Examples 16–19. With the reduction in paraffinic oil content, Examples 16–19 will show reduced oil extraction and oil bleed-out as well.

EXAMPLES 20–21

Examples 20 and 21 represent partial replacement of the styrenic block copolymer and the paraffinic oil in Comparison Example B with a metallocene polyolefin having a molecular weight distribution less than 3, good dispersion of ethylene and butene, and a density of 0.865. The components are shown in Table 13 and physical property results are shown in Table 14.

The results show that increasing replacement of the styrenic block copolymer and paraffinic oil leads to improved elongation and a reduced hardness in comparison to Comapartive Example B. The reduced quantity of paraffinic oil will also result in lower oil extraction and oil bleed-out problems in application.

TABLE 11

| Example | B | 16 | 17 | 18 | 19 |
|---|---|---|---|---|---|
| S-EB-S block copolymer, wt % a) | 59 | 48 | 48 | 48 | 48 |
| Metallocene polyolefin, wt % | | | | | |
| 1 b) | 0 | 15 | 0 | 0 | 0 |
| 2 c) | 0 | 0 | 15 | 0 | 0 |
| 3 d) | 0 | 0 | 0 | 15 | 0 |
| 4 e) | 0 | 0 | 0 | 0 | 15 |
| Crystalline Polyolefin, wt % f) | 15 | 15 | 15 | 15 | 15 |
| Paraffinic Oil, wt % g) | 40 | 23.5 | 23.5 | 23.5 | 23.5 |

a. S-EB-S polymer (32% styrene, Target Mn = 280,000) from Shell.
b. Exact 4049 polymer (ethylene/butene copolymer, dens. 0.873, melt index = 0.8 dg/min) from Exxon.
c. Exact 5009 polymer (ethylene/butene copolymer, dens. 0.865, melt index = 20 deg/min) from Exxon.
d. ENGAGE 8100 polymer (24% octene, dens. 0.87, melt index = 1.0 dg/min) from Dow.
e. ENGAGE 8200 polymer (24% octene, dens. 0.87, melt index = 5.0 dg/min) from Dow.
f. Polypropylene 5A15 (melt flow rate = 5 g/10 min) from Shell.
g. Drakeol 34 paraffinic oil.

TABLE 12

| Example | B | 16 | 17 | 18 | 19 |
|---|---|---|---|---|---|
| Hardness | 72 | 68 | 66 | 69 | 70 |
| Tensile strength, psi | 1105 | 1205 | 764 | 1130 | 1155 |
| Elongation at break, % | 315 | 382 | 286 | 429 | 457 |

While the present invention has been described in connection with certain preferred embodiments, it is to be understood that the subject matter encompassed by way of the present invention is not to be limited to those specific embodiments On the contrary, it is intended for the subject matter of the invention to include all alternatives, modifications and equivalents as can be included within the spirit and scope of the following claims.

TABLE 13

| Example | B | 20 | 21 |
|---|---|---|---|
| S-EB-S block copolymer, wt % a) | 59 | 41.5 | 34.5 |
| Metallocene polyolefin, wt % | | | |
| 1 b) | 0 | 25 | 35 |
| Crystalline Polyolefin, wt % c) | 15 | 15 | 15 |
| Paraffinic Oil, wt % d) | 26 | 18.5 | 15.5 |

a. S-EB-S polymer (32% styrene, Target Mn = 280,000) from Shell.
b. Exact 5009 polymer (ethylene/butene copolymer, dens. 0.865, melt index = 20 dg/min) from Exxon.
c. Polypropylene 5A15 (melt flow rate = 5 g/10 min) from Shell.
d. Drakeol 34 paraffinic oil.

TABLE 14

| Example | B | 20 | 21 |
|---|---|---|---|
| Hardness | 72 | 65 | 63 |
| Tensile strength, psi | 1105 | 883 | 797 |
| Elongation at break, % | 315 | 351 | 391 |

What is claimed is:

1. A soft multicomponent composition, comprising:

from 30% to 50% by weight of hydrocarbon components of a blend of elastomeric polymers;

from 10% to 25% by weight of hydrocarbon components of a crystalline polyolefin; and from 15% to 60% by weight of hydrocarbon components of a paraffinic oil;

wherein the elastomeric polymers comprise:

a styrenic block copolymer having at least two monoalkenyl arene blocks separated by a saturated conjugated diene block; and an elastic metallocene polyolefin having a density from 0.865 to 0.887, and a molecular weight distribution less than 3, and good distribution of ethylene and from 15% to 30% by weight of one or more an α-olefin comonomers having from 4 to 12 carbon atoms; and wherein the styrenic block copolymer is at least 25% by weight of the hydrocarbon components and the metallocene polyolefin is at least 10% by weight of the hydrocarbon components.

2. The composition of claim 1, wherein the block copolymer has the structure S-EB-S.

3. The composition of claim 1, wherein the comonomer in the metallocene polyolefin is butene.

4. The composition of claim 1, further comprising from 5% to 40% by weight of the polymer components of a hard inorganic filler.

* * * * *